United States Patent
Bhat

[19]

[11] Patent Number: 6,097,955
[45] Date of Patent: Aug. 1, 2000

[54] APPARATUS AND METHOD FOR OPTIMIZING CPU USAGE IN PROCESSING PAGING MESSAGES WITHIN A CELLULAR COMMUNICATIONS SYSTEM

[75] Inventor: Kabekode V. Bhat, Naperville, Ill.

[73] Assignee: Lucent Technologies, Inc., Murray Hill, N.J.

[21] Appl. No.: 08/928,566

[22] Filed: Sep. 12, 1997

[51] Int. Cl.[7] ................................... H04B 7/216
[52] U.S. Cl. .................... 455/445; 455/561; 455/426; 455/560; 455/38.1; 455/450; 455/458; 370/335; 370/338
[58] Field of Search ..................... 455/445, 426, 455/560, 561, 38.1, 450, 458; 370/335, 338

[56] References Cited

U.S. PATENT DOCUMENTS

| | | | |
|---|---|---|---|
| 5,117,449 | 5/1992 | Metroka et al. | 455/552 |
| 5,495,484 | 2/1996 | Self et al. | 370/338 |
| 5,511,067 | 4/1996 | Miller | 370/335 |
| 5,541,976 | 7/1996 | Ghisler | 455/426 |

FOREIGN PATENT DOCUMENTS

WO 88/06830   9/1988   United Kingdom ............. H04Q 7/04

*Primary Examiner*—William G. Trost
*Assistant Examiner*—Sonny Trinh
*Attorney, Agent, or Firm*—Walter W. Duft

[57] ABSTRACT

An application processor within a distributed network of a cellular communications system minimizes CPU resource consumption for processing paging messages by determining whether a message received at the application processor is a paging message. In the case that such a message is a paging message, any other components such as radio cluster servers that are not essential for processing the paging message is bypassed within the application processor. A paging message is sent directly to a communication module that sends the paging message to the cells of the cellular communications system. In the case that such a message is not a paging message, the message is determined to be a regular call control message that is sent to components such as the radio cluster servers within the application processor that may have been bypassed for paging messages. CPU resources can be significantly conserved in processing paging messages within the cellular communications system.

15 Claims, 4 Drawing Sheets

APPARATUS AND METHOD FOR OPTIMIZING CPU USAGE IN PROCESSING PAGING MESSAGES WITHIN A CELLULAR COMMUNICATIONS SYSTEM

TECHNICAL FIELD

This invention relates to cellular communications systems, and more particularly, to a cellular communications system that minimizes Central Processing Unit (CPU) usage in processing paging messages.

BACKGROUND OF THE INVENTION

Paging is an integral part of wireless communications, including a cellular communications system, since paging is required for every call having a mobile termination at a mobile station such as a mobile cellular telephone. In a typical cellular communications system, the locations where the mobile station may be located are divided into cells, and a paging message is sent to those cells to determine a current location of the mobile station. At least one application processor having a Central Processing Unit (CPU) is used both for paging and for regular call control functions once a mobile station is found.

Two of the major parameters that indicate performance of such a communications system is the capacity of the communications system and the cost for that capacity. Capacity indicates the volume of calls that can be processed by the system, and a common unit of measure for capacity is KBHCA or Kilo (thousands of) Busy Hour Call Attempts. This unit indicates the number of calls that can be processed per hour during a critical time period of a busy hour in cellular communications traffic such as around 5:00 PM during a weekday when the most number of wireless calls are attempted.

A call requires data processing in the cellular communications system, and a higher calling capacity requires higher processing power. The amount of processing power determines the cost of the cellular communications system since higher processing power means a higher number of central processing units and more elaborate networking among the more numerous central processing units. Thus, cost constrains the capacity of the cellular communications system.

When a calling party first attempts to reach a called party having a mobile station within a cellular communications system, paging is necessary to determine the current location of the mobile station of the called party. The mobile station may be located in any of the cells of a cellular communications system. Thus, paging requires much of the processing resources of the cellular communications system since a paging message is sent to each of the cells to query if the mobile station is located within any one of those cells. Because of this intense processing requirement, part of the cost for call termination in a cellular communications system is presently charged to the called party receiving a call.

Because of the cost of receiving a call, empirical evidence shows that a cellular communications subscriber prefers to make calls rather than receive calls using the cellular communications system. The cellular communications subscriber has substantially little control over receiving phone calls on the cellular phone, and yet, the subscriber is charged for the received calls. Thus, the cellular communications subscriber feels constrained from giving out a cellular phone number, and uses the cellular communications system to receive phone calls in only limited circumstances. Empirically, the cellular communications system is presently a lop-sided system with such subscribers making a disproportionately larger number of calls and receiving only a small number of calls.

Thus, an apparatus and method that reduce the amount of CPU resource used for paging would drive down the cost of receiving calls on cellular communications systems. Such an invention increases capacity of the cellular communications system and reduces the cost of mobile termination such that the cost of receiving calls in a cellular communications system is reduced. Thus, subscribers having mobile stations such as cellular telephones may more freely receive calls on the cellular telephone. As a result, the present invention may result in a cellular communications system with a more equal number of phone calls being made and being received, via the cellular telephone.

SUMMARY OF THE INVENTION

Accordingly, a primary object of the present invention is to provide an apparatus and method for reducing the CPU resource required in paging for a mobile station in a cellular communications system having a distributed network of application processors. The present invention includes an improved application processor having a distributed network interface module for receiving a message from the distributed network of the cellular communications system. The distributed network module recognizes when the message received from the distributed network is a paging message. In the case the message is a paging message, the distributed network module sends such a message directly to a communication module of the improved application processor through a link between the distributed network module and a communication module. In the case the message is not a paging message, the distributed network module sends such a message through radio cluster servers of the improved application processor. In this manner, the present invention bypasses the radio cluster servers within the CPU when a message being processed is a paging message. With this bypassing step, CPU resource may be significantly conserved.

These and other features and advantages of the present invention will be better understood by considering the following detailed description of the invention which is presented with the attached drawings.

DETAILED DESCRIPTION

Figure 1:
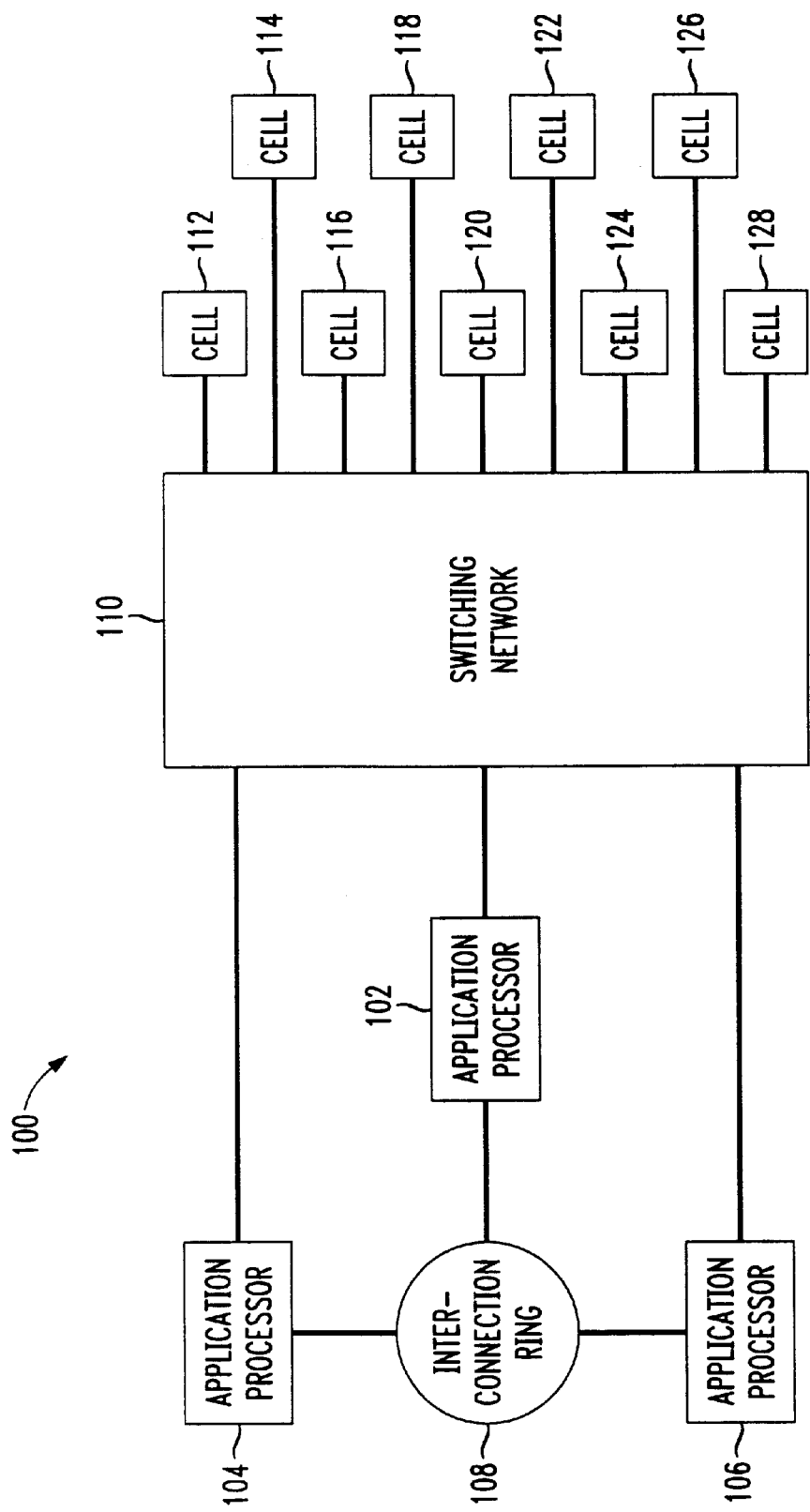
FIG. 1 shows a cellular communications system using a distributed call processing network.

Referring to FIG. 1, a cellular communications system 100 includes a plurality of application processors 102–106 including a first application processor 102, a second application processor 104, and a third application processor 106. The plurality of application processors 102–106 are interconnected to each other via an interconnection ring 108.

Each of the application processors 102–106 is typically a computer that is adapted for processing calls within the cellular communications system 100.

The plurality of application processors 102–106 are also coupled to a switching network 110. This switching network 110 provides a connection between each of the application processors 102–106 and each of a respective three of the cells 112–128 for each of the application processors 102–106. The plurality of cells 112–128 includes a first cell 112, a second cell 114, a third cell 116, a fourth cell 118, a fifth cell 120, a sixth cell 122, a seventh cell 124, an eighth cell 126, and a ninth cell 128.

Each of the cells 112–128 is a geographic region in which cellular service is provided and typically has mobile stations such as portable cellular telephones within each of the cells 112–128. These mobile stations are portable and mobile and are typically moved from cell to cell. The number of cells 112–128 served in the cellular communications system 100 depends in part on the number of application processors 102–106 available to process the calls originating and terminating in those cells 112–128.

For example, for the case of FIG. 1, the first application processor 102 services the three cells 112–116, the second application processor 104 services the three cells 118–122, and the third application processor 106 services the three cells 124–128. It should be appreciated to anyone of ordinary skill in the art that the present invention can be generalized to any number of application processors servicing any number of cells.

Figure 2:
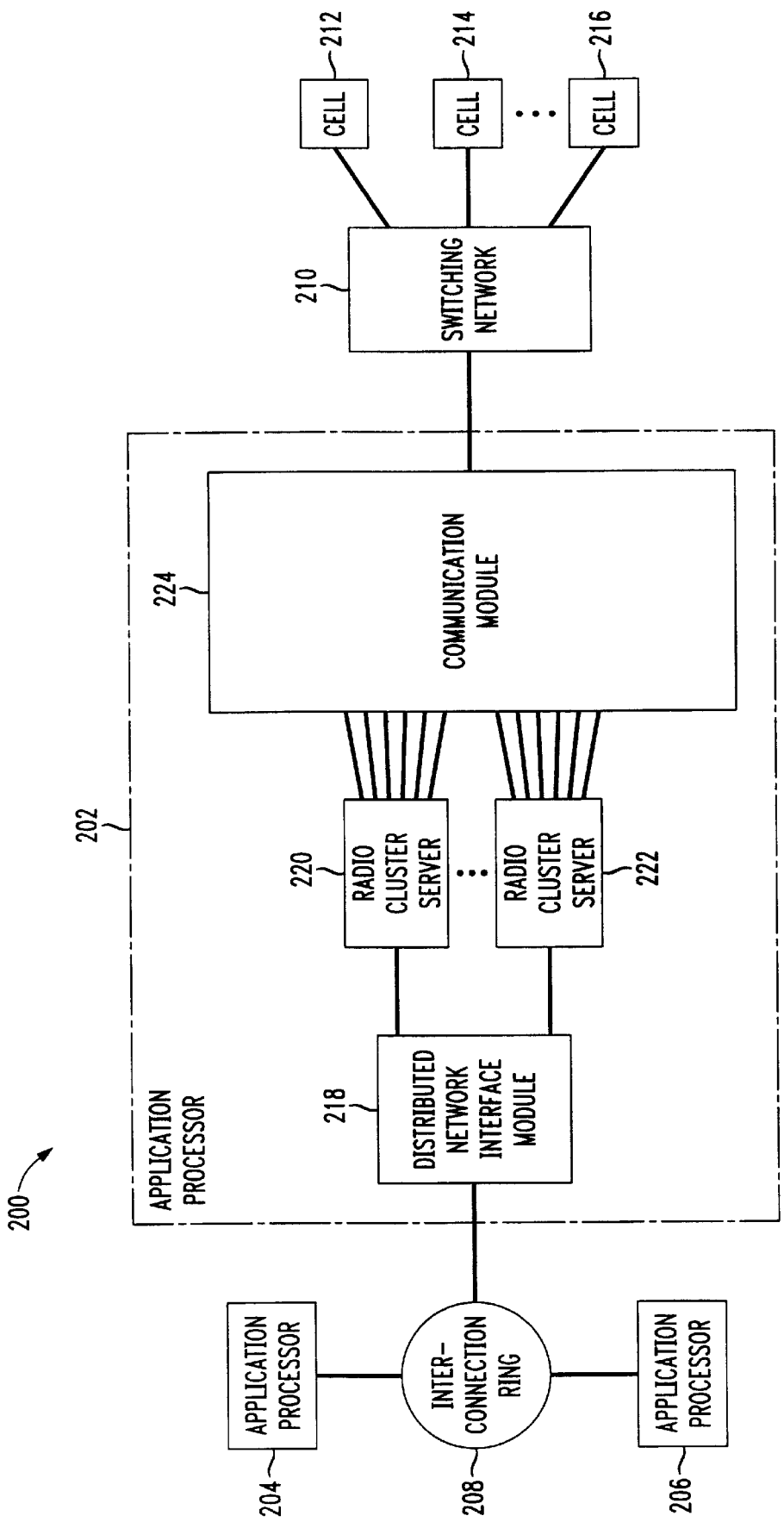
FIG. 2 shows components within each application processor for processing call messages in the cellular communications system of FIG. 1, according to the prior art.

Referring to FIG. 2, a cellular communications system 200, similar to the cellular communications system 100 of FIG. 1, includes a first application processor 202, a second application processor 204, and a third application processor 206, all interconnected to each other via an interconnection ring 208. The plurality of application processors 202–206 are also coupled to a switching network 210. This switching network 210 provides a connection between each of the application processors 202–206 and each of a respective set of cells 212–216 for each of the application processors 202–206. In the illustration of FIG. 2, the switching network is coupled to the respective set of cells 212–216 controlled by the first application processor 202. This set of cells includes a first cell 212, a second cell 214, and so on, up to a ninety-sixth cell 216 (all ninety-six cells are not shown for clarity of illustration).

The first application processor 202, like all other application processors 202–206 in the cellular communications system 200 further includes components 218–224 for processing messages required when a call is underway between a caller and a subscriber having a mobile station such as a cellular telephone in one of the respective set of cells 212–216 controlled by the first application processor 202. When a caller is attempting to call a subscriber having a mobile station in one of those cells 212–216, a paging operation is first performed to find the mobile station of the subscriber (i.e. to determine in which one of the cells 212–216 the mobile station of the subscriber is located).

A paging message must be sent to each of the cells 212–216 to query if a given mobile station of the desired subscriber is within one of the cells 212–216. One of the cells 212–216 having that mobile station therein will respond back to the application processor 202 that one of the cells 212–216 currently holds the desired mobile station. Once the mobile station is located, regular call control messages are sent back and forth between the application processor 202 and one of the cells 212–216 having the mobile station for receiving the call.

Several call control messages are necessary to establish the connection between the caller and the called subscriber having the mobile station, to maintain the connection during the phone call, and to terminate the connection at the end of the phone call. Such regular call control messages are sometimes termed, "call set-up messages", "call tear-down messages", and "hand-off messages" in the cellular communications industry.

In the prior art application processor 202 of FIG. 2, no distinction is made between a paging message and a regular call control message. In the prior art application processor 202, any message whether that message is a paging message or a regular call control message is processed through substantially every component in the Central Processing Unit (CPU) of the application processor 202. Such components include a distributed network interface module 218, a first radio cluster server 220, and so on up to a sixteenth radio cluster server 222 (not all sixteen radio cluster servers are shown in FIG. 2 for clarity of illustration), and a communication module 224.

The distributed network interface module 218 acts as an interface between the application processor 202 and the other application processors 204 and 206 of the cellular communications network 200. This interface module 218 receives a message from another application processor 204 or 206. This message is then passed to each of the at least one radio cluster servers 220–222. In the example illustration of FIG. 2, sixteen radio cluster servers 220–222 are present within the application processor 202. Each of the radio cluster servers 220–222 processes the messages for a respective designated six of the cells 212–216. Thus, in the example illustration of FIG. 2, since there are sixteen radio cluster servers 220–222 and since each of the radio cluster servers 220–222 is designated to six of the cells 212–216, a total of ninety-six cells 212–216 (not all ninety-six cells are shown in FIG. 2 for clarity of illustration) is controlled by the application processor 202.

Each of the radio cluster servers 220–222 further processes the message for the regular call control functions, but does not add any functionality for processing paging messages. In the case a message is a paging message, the radio cluster servers 220–222 recognize that the message is a paging message and passes on the message to the communication module 224 to be sent to each of the cells 212–216 controlled by the radio cluster servers 220–222. The communication module 224 interfaces the application processor 202 to the respective set of cells 212–216 controlled by the application processor 202 via the switching network 210.

In the prior art application processor 202, although radio cluster servers 220–222 add no added functionality in processing a paging message, the paging message is still passed through the radio cluster servers 220–222. The radio cluster servers 220–222 must still perform extraneous processing in recognizing that this message is a paging message and in sending the paging message to the communication module 224. Furthermore, the radio cluster servers 220–222 instruct the communication module 224 to send the paging message to each of the appropriate cells 212–216 controlled by the radio cluster servers 220–222.

When a subscriber having a mobile station is being called, empirical evidence suggests that on average two paging attempts are tried per call. Each call attempt requires a paging message to be sent to an application processor 202–206. In the prior art application processor 202 of FIG. 2, this paging message is sent from the interconnection ring 208 to the distributed network interface module 218. This paging message is then sent to each of the sixteen radio cluster servers 220–222. Thus, one paging message has now spawned into sixteen paging messages. In the example illustration of FIG. 2, each of the radio cluster servers 220–222 controls six of the cells 212–216.

Each of the radio cluster servers 220–222 then generates six paging messages to be sent to each of the cells 212–216 controlled by one of the radio cluster servers 220–222. Now, the one paging message has been further spawned by the radio cluster servers 220–222 into ninety-six messages to be sent to a respective one of the cells 212–216 by the communication module 224. Furthermore, since on average a call attempt requires two pagings, each call on average spawns one hundred and ninety-two paging messages up to the communication module 224.

Processing resources are consumed in processing each of these numerous messages spawned by a paging message. Each message requires additional hand-shaking messages as each processing component 218–224 within the application processor 202 receives and sends a message and as each processing component 218–224 requires context switching time in transitioning between processing different types of messages.

The apparatus and method of the present invention recognizes that the radio cluster servers 220–222 are essential for processing only regular call control messages and bypasses such components 220–222 in the processing of paging messages. This bypassing of the radio cluster servers 220–222 in processing paging messages eliminates the spawning of one paging message into numerous messages, and conserves the computational resources of the radio cluster servers 220–222.

Figure 3:
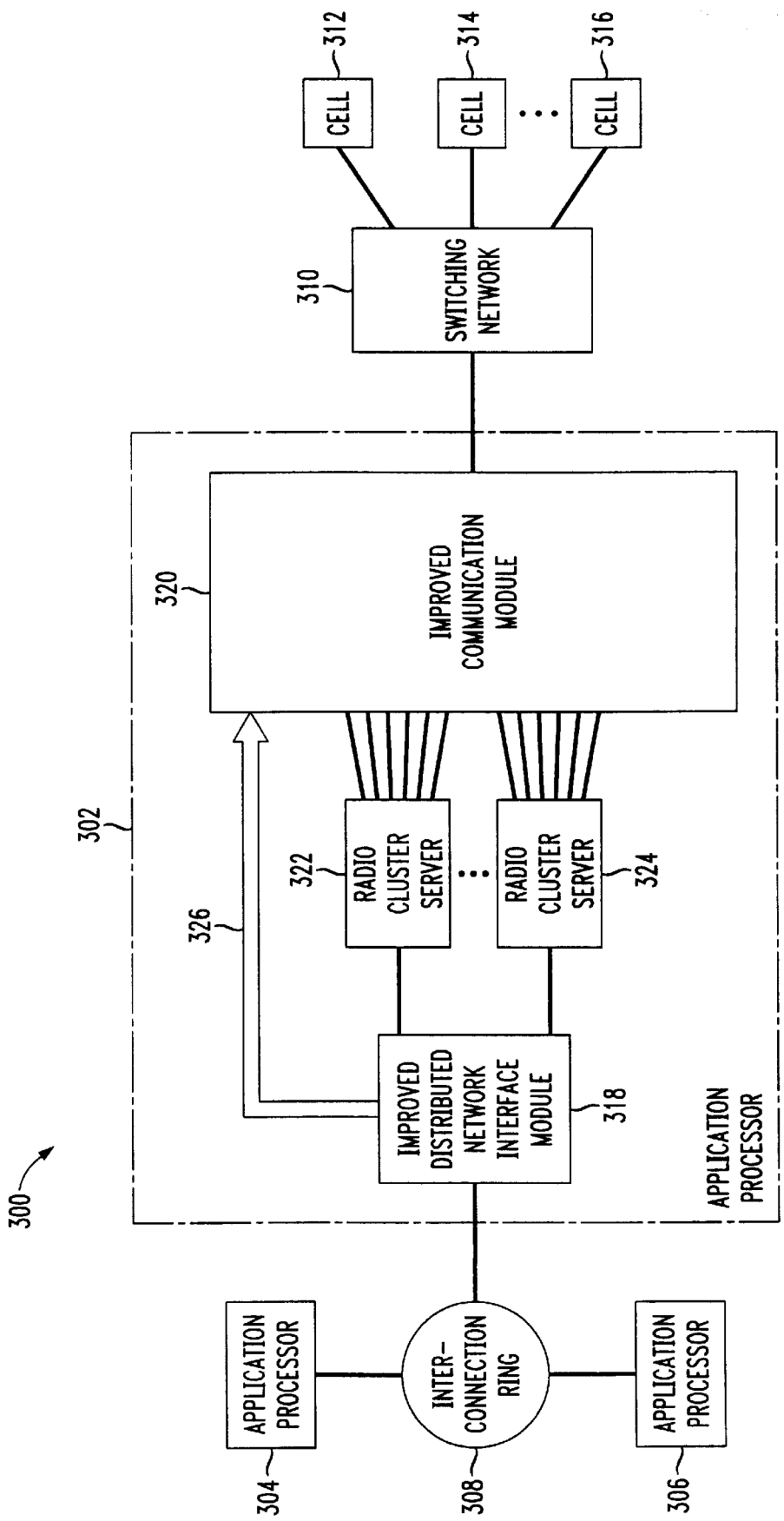
FIG. 3 shows components within each application processor for processing call messages in the cellular communications system of FIG. 1, according to a preferred embodiment of the present invention.

Referring to FIG. 3, a cellular communications system 300 according to a preferred embodiment of the present invention, similar to the cellular communications system 200 of FIG. 2, includes a first application processor 302, a second application processor 304, and a third application processor 306, all interconnected to each other via an interconnection ring 308. Each application processor 302, 304, and 306 is a computer adapted for processing call messages within the cellular communications system 300.

The plurality of application processors 306–306 are also coupled to a switching network 310. This switching network 310 provides a connection between each of the application processors 306–306 and each of a respective set of cells 312–316 for one of those application processors 306–306. In the illustration of FIG. 3, the switching network 320 is coupled to a respective set of cells 312–316 controlled by the first application processor 302. This set of cells 312–316 includes a first cell 312, a second cell 314, and so on, up to a ninety-sixth cell 316 (not all ninety-six cells are shown in FIG. 3 for clarity of illustration).

In contrast to the prior art application processor 202 of FIG. 2, the application processor 302 according to a preferred embodiment of the present invention includes an improved distributed network interface module 318 and an improved communication module 320 that bypass a set of radio cluster servers 322–324 in processing paging messages. The improved distributed network interface module 318 and the improved communications module 320 may be implemented as distinct respective data processors or within one data processor.

In a preferred embodiment of the present invention, the improved distributed network interface module 318 and the improved communications module 320 are software modules within the CPU of the application processor 302. Alternatively, the improved distributed network interface module 318 and the improved communications module 320 may be implemented as individual hardware units such as data processors.

The set of radio cluster servers 322–324 includes a first radio cluster server 322, and so on, up to a sixteenth radio cluster server 324 (not all of the sixteen radio cluster servers are shown in FIG. 3 for clarity of illustration). These radio cluster servers 322–324 provide regular call control functionality, and do not provide added functionality to paging messages. Thus, the radio cluster servers 322–324 are bypassed. In a preferred embodiment of the present invention, the radio cluster servers 322–324 are software modules within the CPU of the application processor 302. Alternatively, the radio cluster servers 322–324 may be implemented as individual hardware units such as data processors.

A direct connection 326 is added between the improved distributed network interface module 318 and the improved communication module 320 to allow the bypassing of the radio cluster servers 322–324. In a preferred embodiment of the present invention, the direct connection 326 is a "go to" statement, or equivalent thereof, from the improved distributed network interface module 318 to the improved communication module 320 in the case these modules 318 and 320 are software modules. A function call for example, might also be used to effect the direct connection 326.

In the case the modules 318 and 320 are hardware units, such as discrete computers or other data processors, the direct connection 326 may be a communications link such as a hardwired metal cable, fibre optic cable or other means for coupling the distributed network interface module 318 to the improved communications module 320.

Figure 4:
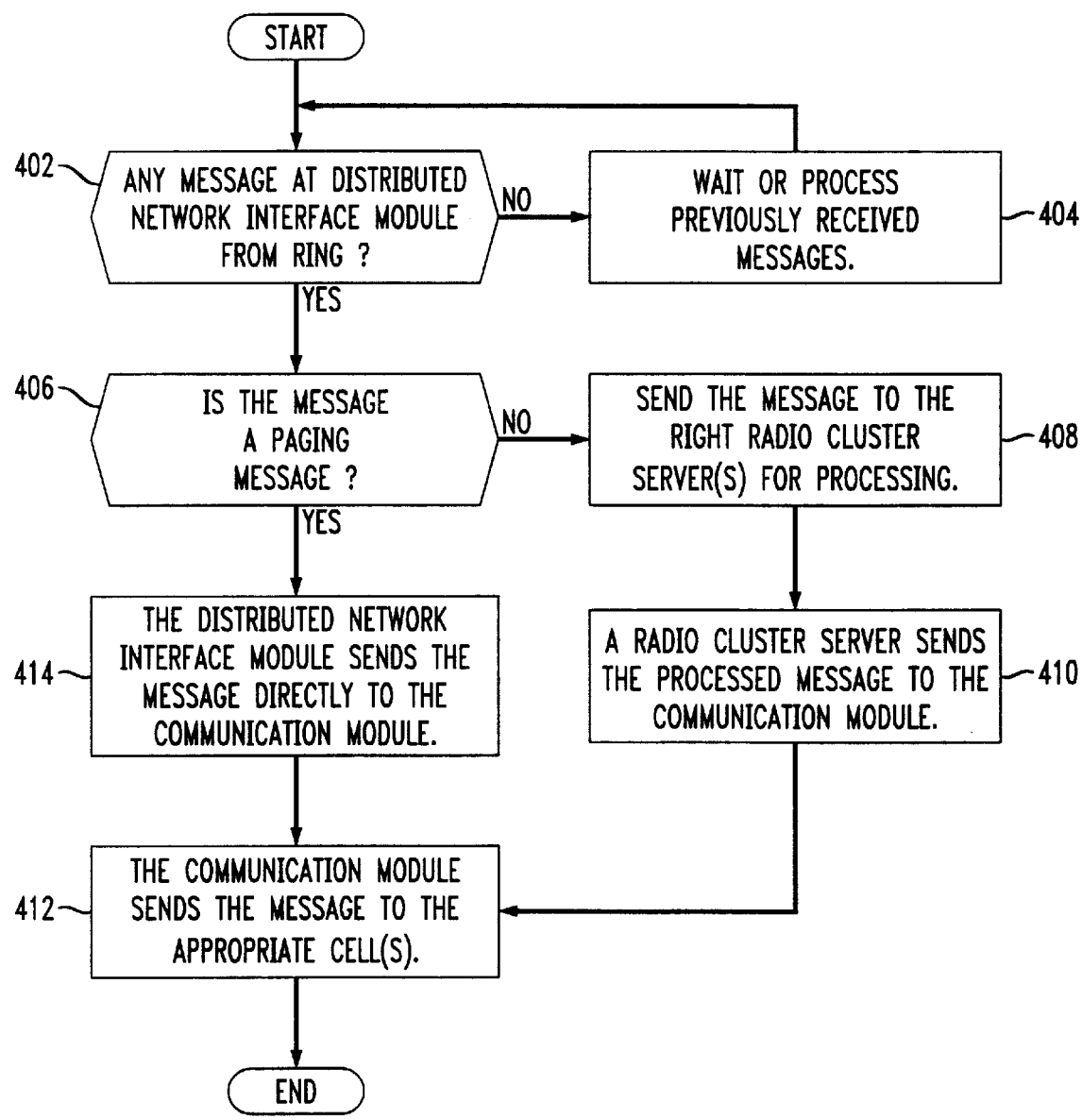
FIG. 4 shows a flowchart of the steps of operation of the components within each application processor of FIG. 3, according to a preferred embodiment of the present invention.

The operation of the application processor 302 and the cellular communications system 300 according to a preferred embodiment of the present invention is now described with reference to the flowchart of FIG. 4. The improved distributed network interface module 318 monitors whether a first message has arrived at the application processor 302 via the interconnection ring 308 at step 402. If a first message has not yet arrived, the distributed network interface module 318 waits for a first message to arrive or continues with processing a previously received message at step 404.

In the case that a first message has just arrived at the improved distributed network interface module 318 from the interconnection ring 308, this module determines whether this first message is a paging message at step 406. In the case that this first message is not a paging message, this first message is determined to be a regular call control message that is processed by the radio cluster servers 322–324. Thus in that case, this first message is sent to the radio cluster servers 322–324 for processing at step 408.

The radio cluster servers 322–324, upon receipt of the first message which is a regular call control message, processes such a message to generate a second message to be sent to a specified cell, and sends this second message to the improved communication module 320 at step 410. The improved communication module 320 then sends this second message to the specified one of the cells 312–316 via the switching network 310 at step 412.

In the case that a first message that has just arrived at the improved distributed network interface module 318 is a paging message, this module sends this message to the communication module 320 directly at step 414, thereby bypassing the radio cluster servers 322–324. The improved communication module 320 is directed by the improved distributed network interface module 318 that this message is a paging message that should be sent to all of the cells 312–316. The improved communication module 320 thus sends this message to all of the cells 312–316 via the switching network 320 at step 412.

Comparing the application processor 302 of the present invention to the prior art application processor 202 of FIG. 2, the bypassing of the radio cluster servers 322–324 eliminates the spawning of the numerous paging messages through the radio cluster servers 322–324. In this manner, CPU resource that is not necessary in properly processing paging messages is conserved. Conservation of CPU resource leads to lower cost for a call termination and conversely to a higher capacity of the cellular communications system for a given amount of CPU resource. Higher capacity also leads to faster processing of call messages in the CPU.

The forgoing is by way of example only and is not intended to be limiting. For example, the cellular communications system 300 of the present invention can have a wide variety of system configurations with a varying number of cells, radio cluster servers, and application processors. In addition, the term "distributed network" of application processors has the broadest meaning of at least two application processors interconnected to process call messages within the cellular communications system 300. The invention is limited only as defined in the following claims and equivalents thereof

I claim:

1. An application processor within a distributed network of a cellular communications system, the application processor comprising:
   means for processing call control messages for every call that is received within one of a plurality of cells of the cellular communications system;
   means for communicating messages to cells within the plurality of cells, including means for communicating paging messages for paging mobile stations within each of the plurality of cells to find a respective mobile station of a called party, and means for communicating said call control messages for controlling calls to and from mobile stations within the plurality of cells;
   means for determining whether a message received from the distributed network is a paging message; and
   means for sending the message directly to the means for communicating messages when the message is a paging message and for sending the message to the means for processing call control messages when the message is not a paging message.

2. A cellular communications system, comprising:
   a plurality of cells;
   a switching network coupled to the plurality of cells; and
   a plurality of application processors coupled to each other via an interconnection ring and coupled to the switching network, each application processor further including:
       means for processing call control messages for every call that is received within one of the plurality of cells;
       means for communicating messages to cells within the plurality of cells, including means for communicating paging messages for paging mobile stations within each of the plurality of cells to find a respective mobile station of a called party, and means for communicating said call control messages for controlling calls to and from mobile stations within the plurality of cells;
       means for determining whether a message received from the interconnection ring is a paging message; and
       means for sending the message received from the interconnection ring directly to the means for communicating messages when the message is a paging message and for sending the message to the means for processing call control messages when the message is not a paging message.

3. An application processor within a distributed network of a cellular communications system, the application processor comprising:
   a distributed network interface module, for receiving a first message from the distributed network and for determining whether the first message is a paging message;
   at least one radio cluster server, coupled to the distributed network interface module, each radio cluster server processing the first message received from the distributed network interface module to generate a second message to be sent to a specified cell within the cellular communications system when the first message is not a paging message; and
   a communication module, coupled to the distributed network interface module and to each of the at least one radio cluster server, for interfacing the application processor to a plurality of cells within the cellular communications system, the communication module processing the first message received directly from the distributed network module when the first message is a paging message to be sent to the plurality of cells, and the communication module processing the second message received from the at least one radio cluster server to be sent to the specified cell when the first message is not a paging message.

4. The application processor of claim 3, wherein each of the at least one radio cluster server processes the first message received from the distributed network interface module when the first message is not a paging message for call control functions for a call received within respective designated six cells of the plurality of cells.

5. The application processor of claim 3, wherein each cell further comprises a plurality of mobile stations, and wherein the communication module sends the first message that is a paging message to each of the mobile stations of each of the plurality of cells to page for a called party having one of the mobile stations within the plurality of cells.

6. The application processor of claim 3, wherein each cell further comprises a plurality of mobile stations, and wherein the communication module sends the second message to the specified cell to maintain a call between a calling party and a called party having one of the mobile stations within the specified cell.

7. A cellular communications system comprising:
   a plurality of cells;
   a switching network coupled to the plurality of cells; and
   a plurality of applications processors coupled to each other via an interconnection ring and coupled to the switching network, each application processor further including:
       a distributed network interface module, coupled to the interconnection ring for interfacing the application processor to other application processors of the plurality of applications processors, said distributed network interface module determining whether a first message received from the interconnection ring is a paging message;

at least one radio cluster server, coupled to the distributed network interface module, each radio cluster server processing the first message received from the distributed network interface module to generate a second message to be sent to a specified cell of the plurality of cells when the first message is not a paging message; and a communication module, coupled to the distributed network interface module and to each of the at least one radio cluster server, for interfacing the application processor to the plurality of cells via the switching network, the communication module processing the first message received directly from the distributed network module when the first message is a paging message to be sent to the plurality of cells, and the communication module processing the second message received from the at least one radio cluster server to be sent to the specified cell when the first message is not a paging message.

8. The cellular communications system of claim 7, wherein each of the at least one radio cluster server processes the first message received from the distributed network interface module when the first message is not a paging message for call control functions for a call received within respective designated six cells of the plurality of cells.

9. The cellular communications system of claim 7, wherein each cell further comprises a plurality of mobile stations, and wherein the communication module sends the first message that is a paging message to each of the mobile stations of each of the plurality of cells to page for a called party having one of the mobile stations within the plurality of cells.

10. The cellular communications system of claim 7, wherein each cell further comprises a plurality of mobile stations, and wherein the communication module sends the second message to the specified cell to maintain a call between a calling party and a called party having one of the mobile stations within the specified cell.

11. A method for bypassing unnecessary call processing components within an application processor of a cellular communications system having a plurality of application processors coupled to an interconnection ring, a switching network coupled to the plurality of application processors, and a plurality of cells coupled to the switching network, the method including the steps of:

A. accepting a first message at a distributed network interface module of an application processor from the interconnection ring;

B. determining whether the first message accepted at the distributed network interface module is a paging message;

C. sending the first message directly to a communication module of the application processor when the first message is a paging message; and D. sending the first message to the at least one radio cluster server when the first message is not a paging message.

12. The method of claim 11, further including the steps of:

processing the first message for call control functions at the at least one radio cluster server to generate a second message to be sent to a specified cell of the plurality of cells; and sending the second message to the communication module.

13. The method of claim 12, further including the steps of:

accepting the second message at the communication module sent by the at least one radio cluster server when the first message is not a paging message; and sending the second message to the specified cell to maintain a call between a calling party and a called party having a mobile station within the specified cell.

14. The method of claim 11, further including the steps of:

accepting the first message at the communication module sent by the distributed network interface module when the first message is a paging message; and sending the first message as a paging message to mobile stations within each of the plurality of cells to page for a called party having one of the mobile stations.

15. A method for processing calling messages within an application processor of a cellular communications system having a plurality of application processors coupled to an interconnection ring, a switching network coupled to the plurality of application processors, and a plurality of cells coupled to the switching network, the method including the steps of:

accepting a first message at a communications module of the application processor sent directly by a distributed network interface module after recognizing that the first message is a paging message;

sending the first message as a paging message to mobile stations within each of the plurality of cells to page for a called party having one of the mobile stations;

accepting a second message at the communication module sent by at least one radio cluster server within the application processor wherein the second message is derived from the at least one radio cluster server processing the first message sent from the distributed network interface after recognizing that the first message is not a paging message; and sending the second message to a specified cell to maintain a call between a calling party and a called party having a mobile station within the specified cell.

* * * * *